United States Patent
Huang et al.

(10) Patent No.: US 11,418,143 B2
(45) Date of Patent: Aug. 16, 2022

(54) CONTROL METHOD AND APPARATUS, POWER SYSTEM, AND ELECTRIC VEHICLE

(71) Applicant: CONTEMPORARY AMPEREX TECHNOLOGY CO., LIMITED, Ningde (CN)

(72) Inventors: Xiaojian Huang, Ningde (CN); Zhimin Dan, Ningde (CN); Xianxi Pan, Ningde (CN); Xiyang Zuo, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/529,917

(22) Filed: Nov. 18, 2021

(65) Prior Publication Data

US 2022/0209707 A1 Jun. 30, 2022

Related U.S. Application Data

(63) Continuation of application No. PCT/CN2021/073996, filed on Jan. 27, 2021.

(30) Foreign Application Priority Data

Dec. 24, 2020 (CN) .......................... 202011554389.6

(51) Int. Cl.
*H02P 29/60* (2016.01)
*B60L 50/51* (2019.01)
*H02P 27/06* (2006.01)

(52) U.S. Cl.
CPC .............. *H02P 29/60* (2016.02); *B60L 50/51* (2019.02); *H02P 27/06* (2013.01)

(58) Field of Classification Search
USPC ........................................................ 318/139
See application file for complete search history.

(56) References Cited

U.S. PATENT DOCUMENTS

2006/0198426 A1* 9/2006 Partyka .................. H04B 1/713
375/E1.033
2006/0290325 A1 12/2006 Ashtiani
(Continued)

FOREIGN PATENT DOCUMENTS

CN 102934355 A 2/2013
CN 103560304 A 2/2014
(Continued)

*Primary Examiner* — Jorge L Carrasquillo
(74) *Attorney, Agent, or Firm* — Scully Scott Murphy & Presser

(57) ABSTRACT

The present application provides a control method, an apparatus, a power system, and an electric vehicle, relating to the field of electric vehicles. The method includes: obtaining a battery cell temperature of a power battery, and sending a first control signal to an inverter when the battery cell temperature meets a preset power battery heating condition, where the first control signal is configured to control the inverter to convert a current provided by the power battery into an alternating current with a randomly changing frequency, and the alternating current with a randomly changing frequency is configured to supply power to a permanent magnet motor. New frequency components may be introduced to evenly distribute originally concentrated radial electromagnetic forces to an entire stator, thereby reducing vibration noises during the heating process of the power battery.

14 Claims, 5 Drawing Sheets

(56) References Cited

U.S. PATENT DOCUMENTS

| | | | |
|---|---|---|---|
| 2011/0074326 A1 | 3/2011 | Su | |
| 2013/0169206 A1 | 7/2013 | Suhama et al. | |
| 2018/0162379 A1* | 6/2018 | Mizuno | B60W 20/15 |
| 2020/0212520 A1 | 7/2020 | Dan et al. | |
| 2020/0343848 A1* | 10/2020 | Lee | H02P 27/085 |
| 2021/0043990 A1 | 2/2021 | Dan et al. | |
| 2021/0351732 A1* | 11/2021 | Shen | B60K 6/22 |

FOREIGN PATENT DOCUMENTS

| | | | | |
|---|---|---|---|---|
| CN | 106058360 A | * | 10/2016 | B60H 1/00278 |
| CN | 106330011 A | | 1/2017 | |
| CN | 106494385 A | * | 3/2017 | B60K 6/365 |
| CN | 110048192 A | | 7/2019 | |
| CN | 110932585 A | | 3/2020 | |
| CN | 110962631 A | | 4/2020 | |
| CN | 111347935 A | | 6/2020 | |
| CN | 111439132 A | | 7/2020 | |
| CN | 112078433 A | | 12/2020 | |
| CN | 112103595 A | | 12/2020 | |
| JP | 2000184731 A | | 6/2000 | |
| JP | 2014072955 A | | 4/2014 | |
| WO | WO-2020204584 A1 | * | 10/2020 | G01R 31/3648 |

\* cited by examiner

CONTROL METHOD AND APPARATUS, POWER SYSTEM, AND ELECTRIC VEHICLE

CROSS-REFERENCE TO RELATED APPLICATIONS

This application is a continuation of International Application No. PCT/CN2021/073996, filed on Jan. 27, 2021, which claims priority to Chinese Patent Application No. 202011554389.6, filed on Dec. 24, 2020. The disclosures of the aforementioned applications are hereby incorporated by reference in their entireties.

TECHNICAL FIELD

The present application relates to the field of electric vehicle, and more specifically, to a control method, an apparatus, a power system, and an electric vehicle.

BACKGROUND

An electric vehicle refers to a vehicle powered by a power battery. Due to limitation of material for power battery, the power battery can stably exert an optimal performance only under a rated ambient temperature. Therefore, when the electric vehicle is used in areas with lower ambient temperatures, the power battery needs to be heated to the rated ambient temperature.

The internal resistance of the power battery is usually used to heat the power battery, and the stator winding of the motor is used as an energy storage element to provide heating current for the power battery. Since the internal resistance of the power battery is larger in a low-temperature environment, the heating efficiency of the power battery is higher.

However, in the foregoing method, magnetic field distribution of the motor during normal operation is changed, and an internal force of the motor is unbalanced, so that the motor generates a lot of noises when heating the power battery.

SUMMARY

The present application provides a method and an apparatus for controlling a permanent magnet motor, a power system and an electric vehicle therefor to reduce noises of the power battery during a self-heating process.

According to a first aspect, a control method is provided in the present application, the method being applied to a power system, the power system including a power battery, a permanent magnet motor, and an inverter, where the method includes:

obtaining a battery cell temperature of the power battery; and sending a first control signal to the inverter when the battery cell temperature meets a preset power battery heating condition, where the first control signal is configured to control the inverter to convert a current provided by the power battery into an alternating current with a randomly changing frequency, and the alternating current with a randomly changing frequency is configured to supply power to the permanent magnet motor.

In some embodiments, before the sending a first control signal to the inverter, the method further includes:

generating a plurality of set frequencies randomly, and determining duration of each set frequency according to each set frequency;

determining a reference value sequence of a d-axis component according to the set frequencies and the duration of each set frequency, and setting a reference signal sequence of a q-axis component to a zero sequence; and generating the first control signal according to the reference value sequence of the d-axis component, the reference value sequence of the q-axis component, and a motor parameter of the permanent magnet motor.

In the foregoing embodiments, a plurality of set frequencies are randomly generated, duration of each set frequency is determined according to each set frequency, and the first control signal is generated according to the set frequency and the duration of the set frequency, to control the inverter to convert a current provided by the power battery into an alternating current with a randomly changing frequency. New frequency components are introduced to evenly distribute originally concentrated radial electromagnetic forces to the entire stator, thereby reducing vibration noises during the heating process of the power battery.

In some embodiments, the determining duration of each set frequency according to each set frequency specifically includes:

taking an entire period length corresponding to the set frequency as the duration of the set frequency; or taking a half period length corresponding to the set frequency as the duration of the set frequency.

In the foregoing embodiments, the duration of the set frequency is set to a half period length or an entire period length corresponding to the set frequency, so that it is convenient to detect an alternating current which is used for driving the motor, adjust the control signal in real time, and ensure noise suppression effects.

In some embodiments, the method further includes:

sending a second control signal to the inverter when the battery cell temperature meets a preset power battery heating condition, where the second control signal is configured to control the inverter to convert a current provided by the power battery into an alternating current with a periodically changing amplitude, and the alternating current with a periodically changing amplitude is configured to supply power to the permanent magnet motor.

In the foregoing embodiments, the first control signal and the second control signal are sent to the inverter when the battery cell temperature of the power battery meets the heating condition of the power battery, to control the inverter to convert the current of the power battery into the alternating current with a randomly changing frequency and a periodically changing amplitude. New frequency components are introduced to further reduce vibration noises during the heating process of the power battery.

In some embodiments, before the sending a second control signal to the inverter, the method further includes:

determining a plurality of set amplitudes and duration of each set amplitude according to a heating parameter and a maximum noise threshold of the power battery;

determining a reference value sequence of a d-axis component according to the set amplitudes and the duration of each set amplitude, and setting a reference value sequence of a q-axis component to a zero sequence; and generating the second control signal according to the reference value sequence of the d-axis component, the reference value sequence of the q-axis component, and a motor parameter of the permanent magnet motor.

In the foregoing embodiments, the plurality of set amplitudes and duration of each set amplitude are determined according to the heating parameter and the maximum noise threshold of the power battery when the battery cell temperature of the power battery meets a self-heating condition of the battery, to generate the second control signal according to the set amplitudes and the duration, so that under common control of the first control signal and the second control signal, the inverter converts the current provided by the power battery into the alternating current with a randomly changing frequency and a periodically changing amplitude. More frequency components are introduced to evenly distribute originally concentrated radial electromagnetic forces to the entire stator, thereby greatly reducing vibration noises during the heating process of the power battery.

In some embodiments, the heating parameter includes a heating rate and a heating duration.

In some embodiments, an amplitude reference value in the reference value sequence of the d-axis component increases or decreases periodically.

In some embodiments, the battery cell temperature meets a preset power battery heating condition specifically includes:

the battery cell temperature is less than the lowest operating temperature of the power battery.

According to a second aspect, a control apparatus is provided in the present application, including:

an obtaining module, configured to obtain a battery cell temperature of a power battery; and a processing module, configured to send a first control signal to an inverter when the battery cell temperature meets a preset power battery heating condition, where the first control signal is configured to control the inverter to convert a current provided by the power battery into an alternating current with a randomly changing frequency, and the alternating current with a randomly changing frequency is configured to supply power to the permanent magnet motor.

According to a third aspect, a power system is provided in the present application, including: a power battery, an inverter, a permanent magnet motor, and a motor controller unit, where the motor controller unit is configured to execute the control method according to the first aspect and optional solutions.

According to a fourth aspect, an electric vehicle is provided in the present application, including a power system, where the power system includes a power battery, an inverter, a permanent magnet motor, and a motor controller unit, and the motor controller unit is configured to execute the control method according to the first aspect and optional solutions.

The embodiments of the present application provide a control method, an apparatus, a power system, and an electric vehicle. A first control signal is sent to an inverter when a battery cell temperature of the power battery meets a heating condition of the power battery, where the first control signal is configured to control the inverter to convert a current provided by the power battery into an alternating current with a randomly changing frequency, and the alternating current with a randomly changing frequency is configured to supply power to a motor. New frequency components are introduced to evenly distribute originally concentrated radial electromagnetic forces to an entire stator, thereby reducing vibration noises during the heating process of the power battery. In addition, the first control signal and a second control signal are sent to the inverter, to control the inverter to convert the current provided by the power battery into the alternating current with a randomly changing frequency and a periodically changing amplitude. New frequency components are introduced to further reduce vibration noises during the heating process of the power battery.

DESCRIPTION OF EMBODIMENTS

To make the objectives, technical solutions, and advantages of the present application clearer, the technical solutions in the present application will be clearly and completely described below with reference to the accompanying drawings in the present application. Obviously, the described embodiments are some of, rather than all of, the embodiments of the present application. All the other embodiments obtained by those of ordinary skill in the art based on the embodiments in the present application without creative efforts shall fall within the scope of protection of the present application.

Figure 1:
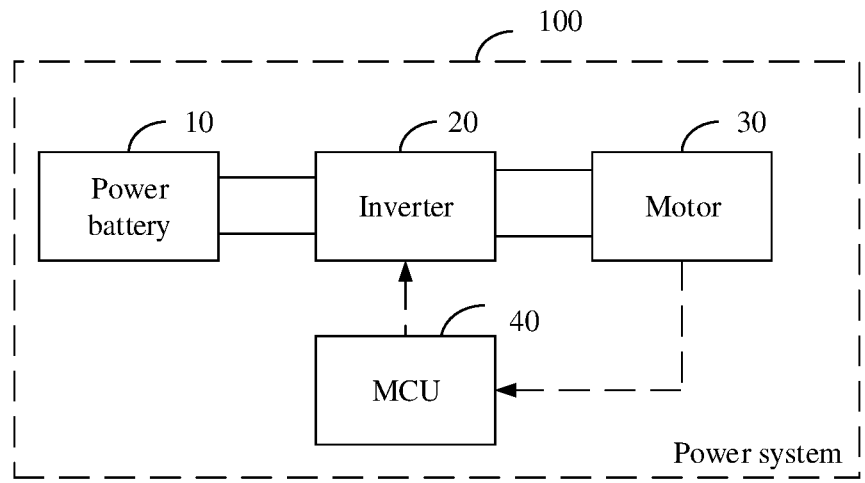
FIG. 1 is a schematic structural diagram of a power system according to an embodiment of the present application.

An electric vehicle refers to a vehicle powered by a power battery. As shown in FIG. 1, a power system 100 of the electric vehicle includes a power battery 10, an inverter 20, a motor 30, and a motor controller unit (MCU) 40. Positive and negative electrodes of the power battery 10 are connected to a direct current side of the inverter 20, and an alternating current side of the inverter 20 is connected to a stator winding of the motor 30. The power battery 10 supplies power to the motor 30 through the inverter 20. The MCU 40 has a plurality of input terminals for receiving motor operating status data. The MCU 40 generates a pulse width modulation (PWM) signal according to the motor operating status data and operating status data of the power battery, and controls the voltage and current supplied by the inverter 20 to the motor 30, to control a speed of the motor 30, thereby achieving vehicle speed control.

Figure 2:
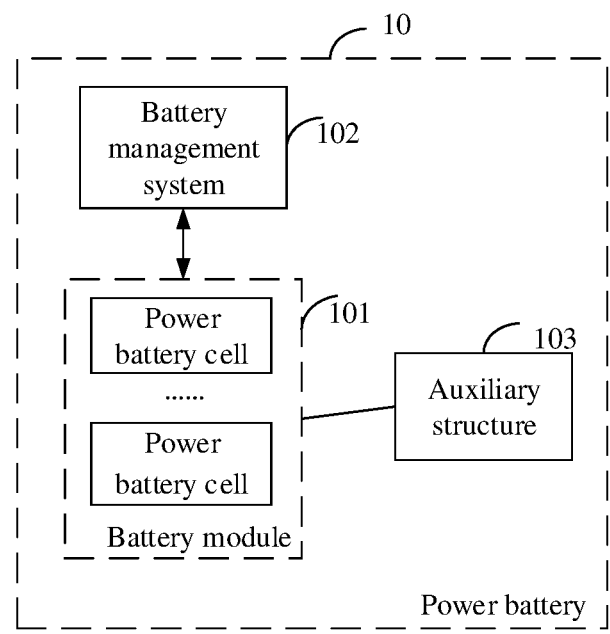
FIG. 2 is a schematic structural diagram of a power battery according to an embodiment of the present application.

As shown in FIG. 2, the power battery 10 includes a battery module 101, a battery management system (BMS) 102, and an auxiliary structure 103. The battery module 101 is formed by a plurality of power battery cells in series and parallel. The battery cell is a core component of the power battery and is a source of electric energy provided by the power battery. Main functions of the battery management system 102 are to perform charge and discharge management, high voltage control, battery state evaluation, battery data collection, battery protection, and battery thermal management. Generally, the auxiliary structure 103 includes an external frame, an electrical connection apparatus, an insulating component, and the like. The external frame plays the roles of protecting and supporting the battery module, the electrical connection apparatus plays a role of connecting with other electrical devices, such as connecting with the inverter, and the insulating component plays a role of insulation protection.

The thermal management function of the battery management system 102 is used to ensure that the power battery operates within a suitable temperature range. The thermal management function is mainly to achieve accurate measurement and monitoring of the battery temperature, effective heat dissipation when a temperature of a battery group is too high, fast heating up under low temperature conditions, and ensure uniform distribution of temperature field of the battery group. The fast heating up under low temperature conditions means that in areas where the battery cell temperature is relatively low, the power battery needs to be heated to the rated battery cell temperature so that the power battery can stably exert an optimal performance.

Existing methods of heating power battery may include indirect heating and direct heating. The indirect heating refers to placing a heat source outside the power battery for heating. The indirect heating method may be air heating, liquid heating, heating film heating, and the like. For different heating sources, heating rates of the battery are also different. Since the battery is heated through an external heat source, and heat losses will occur on a heat transfer medium. Therefore, efficiency of indirect heating is not high.

The direct heating refers to heating the power battery inside the power battery. A common direct heating method is heating through an internal resistance, specifically: the power battery is connected to the motor through an inverter, the motor rotor is fixed, a PWM signal is input to the control end of the inverter, the power battery and the stator winding form a closed loop, and the stator winding stores electric energy. Due to the inductance characteristics of the stator winding, the stator winding also provides alternating current to the battery, and the power battery is heated by the alternating current flowing through its internal resistance. Since the internal resistance of the power battery is larger in a low-temperature environment, the heating efficiency of the power battery is higher.

However, in the existing method of heating through the internal resistance of the power battery, when the motor provides heating current for the power battery, the stator winding is used as an energy storage element to realize bus current alternating. The foregoing method changes magnetic field distribution of the motor during normal operation, which makes an internal force of the motor unbalanced, and easily causes vibration and noise of the motor, thereby causing NVH three indexes of the electric vehicle substandard. NVH is the abbreviation of Noise, Vibration, and Harshness. They are important indexes to measure comfort of a vehicle.

To resolve the technical problems mentioned above, embodiments of the present application provide a control method, an apparatus, a power system, and an electric vehicle. An inventive concept of the present application is: setting a current of a q-axis or a voltage of a q-axis to 0, applying all voltages or currents to a d-axis, so that an output torque of the motor is 0, and an inductance of the motor is used for energy storage to realize a self-heating function of the battery. On the basis of controlling the voltage or current of the d-axis of the battery to be a sine wave, additional current harmonic components are introduced by randomly changing the frequency of the voltage or current of the d-axis. Thus radial electromagnetic forces of the motor are distributed to the stator more evenly under the condition of battery self-heating, so as to reduce noises of the motor under the condition of self-heating. In addition, by randomly changing the frequency of the voltage or current of the d-axis, and periodically changing the amplitude of the voltage or current of the d-axis, more current harmonic components may be introduced, so that the radial electromagnetic forces are evenly distributed to the entire stator, thereby greatly reducing vibration noises during the heating process of the power battery.

Figure 3:
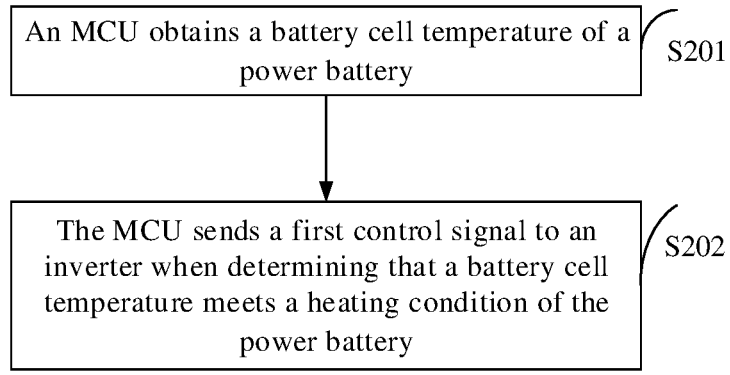
FIG. 3 is a schematic flowchart of a control method according to an embodiment of the present application.

As shown in FIG. 3, an embodiment of the present application provides a control method. The control method is applied to the power system shown in FIG. 1. An execution body of the control method is an MCU, and the control method includes the following steps:

S201. The MCU obtains a battery cell temperature of the power battery.

A temperature sensor is deployed inside the power battery to monitor the battery cell temperature of the power battery in real time, and the temperature sensor transmits the detected battery cell temperature to the MCU.

S202. The MCU sends a first control signal to the inverter when determining that the battery cell temperature meets a heating condition of the power battery.

The heating condition of the power battery refers to that the battery cell temperature of the power battery is lower than the lowest operating temperature. If the battery cell temperature of the power battery is lower than the lowest operating temperature, it means that the battery cell temperature of the power battery meets the heating condition of the power battery. If the battery cell temperature of the power battery is higher than or equal to the lowest operating temperature, it means that the battery cell temperature of the power battery does not meet the heating condition of the power battery.

The first control signal is configured to control the inverter to convert a current provided by the power battery into an alternating current with a randomly changing frequency, and the alternating current with a randomly changing frequency is configured to supply power to the permanent magnet motor, so that the power battery uses its own resistance for self-heating.

According to the control method provided in the embodiments of the present application, the first control signal is generated when the battery cell temperature of the power battery meets the self-heating condition of the battery, so that the inverter converts the current provided by the power battery into the alternating current with a randomly changing frequency. New frequency components are introduced to evenly distribute originally concentrated radial electromagnetic forces to the entire stator, thereby reducing vibration noises during the heating process of the power battery.

Another embodiment of the present application provides a control method. The control method is applied to the power system shown in FIG. 1. An execution body of the control method is an MCU, and the control method includes the following steps:

S301. The MCU obtains a battery cell temperature of the power battery.

A temperature sensor is deployed inside the power battery to monitor the battery cell temperature of the power battery in real time, and the temperature sensor transmits the detected battery cell temperature to the MCU.

S302. The MCU generates a plurality of set frequencies randomly when determining that the battery cell temperature meets a heating condition of the power battery, and determines duration of each set frequency according to each set frequency.

A plurality of set frequencies are generated randomly when the battery cell temperature is less than the lowest operating temperature of the power battery. The set frequency is a frequency of the current passing through the motor, namely, an alternating current at the set frequency is used to power the motor.

As one specific method to determine the duration of each set frequency, an entire period length corresponding to the set frequency is taken as the duration of the set frequency. If the set frequency is f, the entire period length corresponding to the set frequency is 1/f, which means that each set frequency lasts for one period length.

As another specific method to determine the duration of each set frequency, a half period length corresponding to the set frequency is taken as the duration of the set frequency. If the set frequency is f, the half period length corresponding to the set frequency is ½f, which means that each set frequency lasts for a half period length.

S303. A reference value sequence of a d-axis component is determined according to the set frequencies and the duration of each set frequency, and a reference signal sequence of a q-axis component is set to a zero sequence.

If the set frequencies generated randomly are f1, f2, ..., and fn, the duration corresponding to the set frequency f1 is t11, the duration corresponding to the set frequency f2 is t12, ..., and the duration corresponding to the set frequency fn is t1n.

The reference value sequence of the d-axis component includes a plurality of reference values. Each reference value includes an amplitude reference value component, a frequency reference value component, and a duration reference value component. The amplitude reference value component may also be any value I1, the frequency reference value component is the set frequency, and the duration reference value component is the duration corresponding to the set frequency. Namely, the reference value sequence of the d-axis component is {(I1, f1, t11), (I1, f2, t12), ..., and (I1, fn, t1n)}.

The reference value sequence of the q-axis component includes a plurality of reference values. Each reference value includes an amplitude reference value component, a frequency reference value component, and a duration reference value component. The amplitude reference value component, the frequency reference value component, and the duration reference value component are all zero. Namely, the reference value sequence of the q-axis component is {(0, 0, 0), (0, 0, 0), ..., and (0, 0, 0)}.

S304. A first control signal is generated according to the reference value sequence of the d-axis component, the reference value sequence of the q-axis component, and a motor parameter of the permanent magnet motor.

Figure 4:
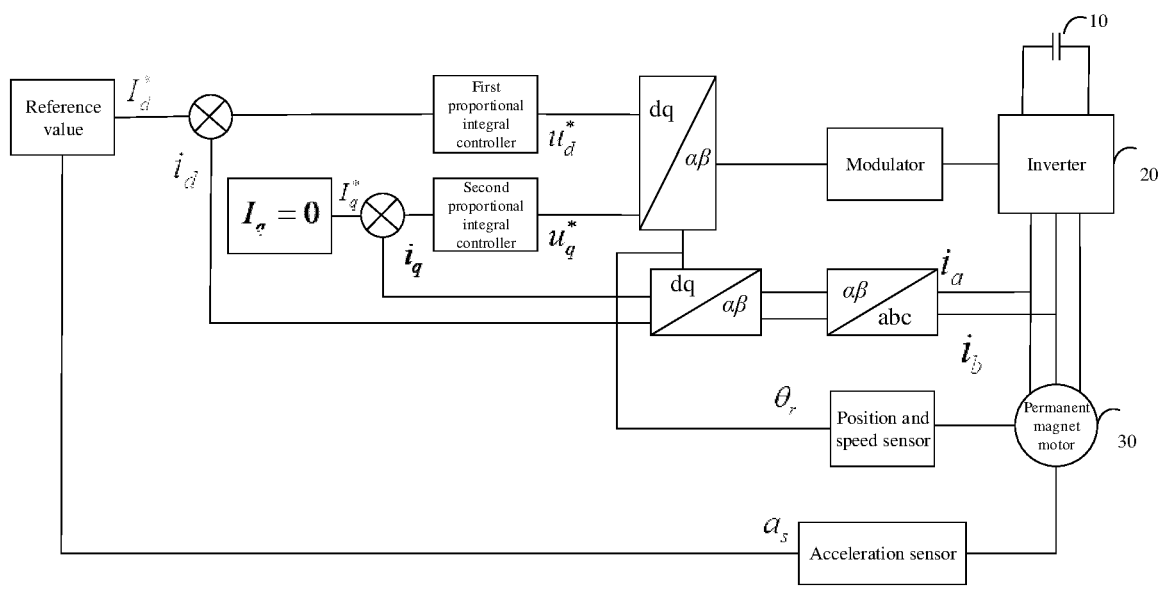
FIG. 4 is a schematic flowchart of vector control of a permanent magnet motor according to an embodiment of the present application.

As shown in FIG. 4, the motor parameter of the permanent magnet motor includes an acceleration, a rotation speed, a position, and a stator current of the permanent magnet motor.

According to the rotation speed and position of the motor, a d-axis real-time component of the stator current and a q-axis real-time component of the stator current of the permanent magnet motor are obtained through a coordinate conversion of the stator current.

An input value of a first proportional integral controller is generated according to the d-axis real-time component of the stator current, the acceleration of the permanent magnet motor, and a reference value of the d-axis component of the stator current. The first proportional integral controller outputs a d-axis reference value of a stator voltage.

An input value of a second proportional integral controller is generated according to the q-axis real-time component of the stator current and a reference value of the q-axis component. The second proportional integral controller outputs a q-axis reference value of the stator voltage.

Then a reference value of the stator voltage is obtained through a coordinate conversion of the d-axis reference value of the stator voltage, the q-axis reference value of the stator voltage, the rotation speed and position of the motor, and the first control signal is generated according to the reference value of the stator voltage. The first control signal is a space vector pulse width modulation (SVPWM) signal.

S305. The MCU sends the first control signal to the inverter when determining that the battery cell temperature meets the heating condition of the power battery.

Figure 5:
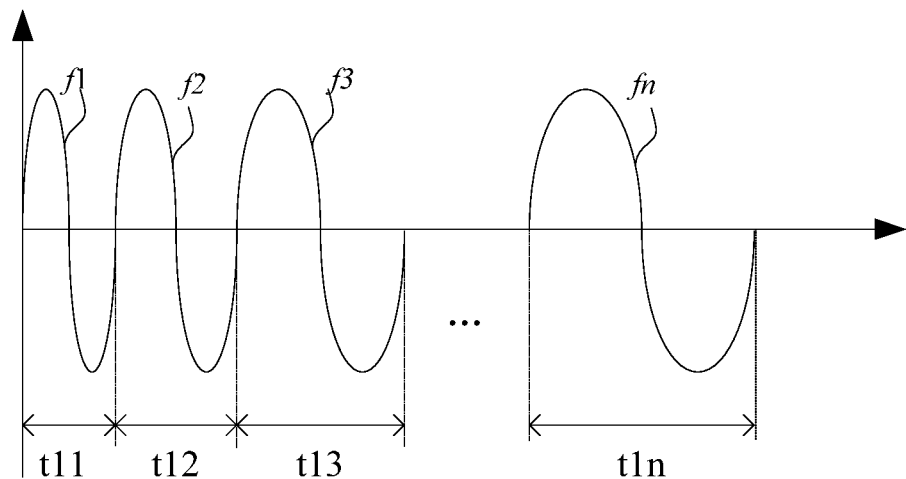
FIG. 5 is a schematic diagram of an alternating current for driving a motor according to an embodiment of the present application.

The first control signal is configured to control the inverter to convert a current provided by the power battery into an alternating current with a randomly changing frequency. As shown in FIG. 5, the frequency of the alternating current in succession is f1, f2, ..., and fn, the duration corresponding to the frequency f1 is t11, the duration corresponding to the frequency f2 is t12, ..., the duration corresponding to the frequency fn is t1n, and an amplitude of the alternating current is I1.

The alternating current with a randomly changing frequency is configured to supply power to the permanent magnet motor, so that the power battery uses its own resistance for self-heating. The following describes a process of controlling the inverter to heat the power battery.

Figure 6:
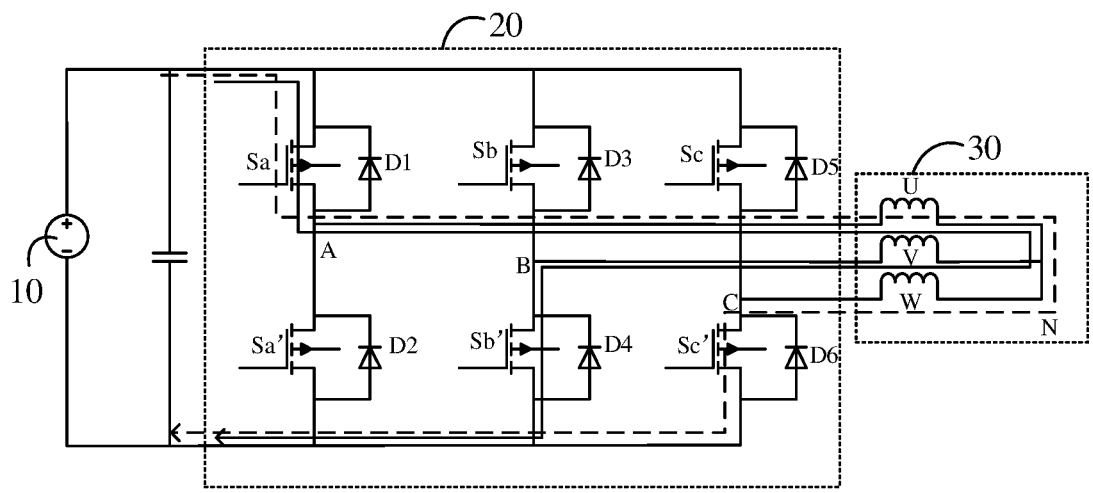
FIG. 6 is a schematic diagram of one operating status of a power system according to an embodiment of the present application.

As shown in FIG. 6, the first control signal controls the inverter. The MCU drives and closes a power switch device Sa on an A-phase bridge arm, a power switch device Sb' on a B-phase bridge arm, and a power switch device Sc' on a C-phase bridge arm, to form two discharge circuits. One of the discharge circuits is: power battery→Sa→stator winding U→stator winding V→Sb'→power battery, and the other discharge circuit is: power battery→Sa→stator winding U→stator winding W→Sc'→power battery. The power battery discharges and converts electrical energy into electromagnetic energy on the three-phase stator winding, a motor rotor is at a standstill, the stator windings store energy, and an alternating bus current is realized at both bus ends of the power battery to heat the battery.

Figure 7:
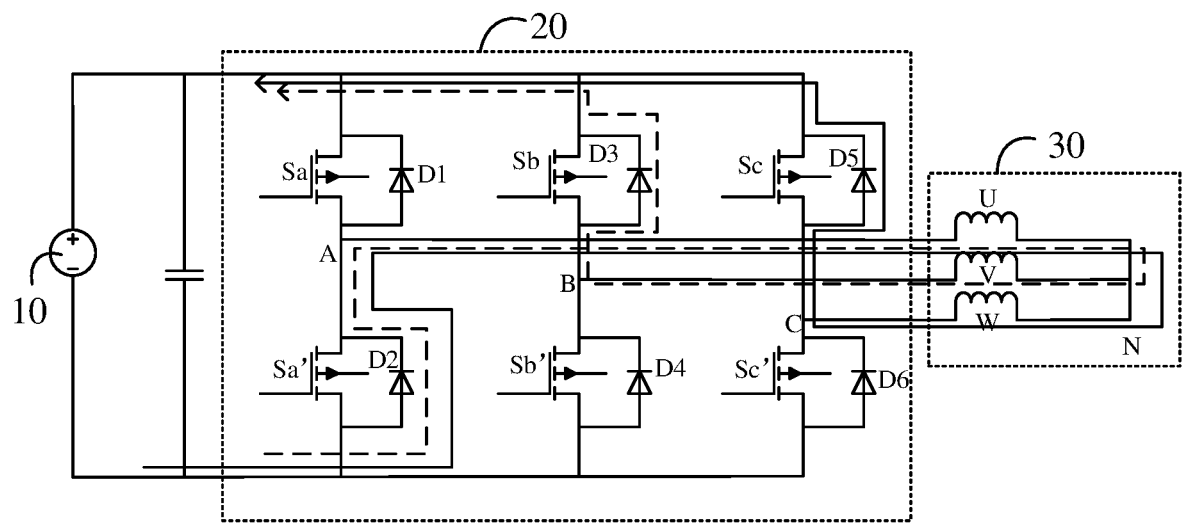
FIG. 7 is a schematic diagram of another operating status of a power system according to an embodiment of the present application.

At the next time, the power switch device Sa on the A-phase bridge arm, the power switch device Sb' on the B-phase bridge arm, and the power switch device Sc' on the C-phase bridge arm are disconnected simultaneously. Due to the characteristic that the current in the stator winding cannot be changed suddenly, a backwash current loop thereof is shown in FIG. 7. Two backwash current loops are: power battery→diode D2→stator winding U→stator winding V→diode D3→power battery, and power battery→diode D2→stator winding U→stator winding W→diode D5→power battery. During discharging and charging processes of the stator winding in the motor, current flows through the power battery, thereby heating the battery pack.

A magnitude of a heating current in a discharge loop is determined by a time when the power switch is closed, namely, the frequency f and the duty ratio D of a control signal for controlling the power switch device.

According to the control method provided in the embodiments of the present application, the set frequencies are randomly generated when the battery cell temperature of the power battery meets the self-heating condition of the battery, and duration of each set frequency is determined according to the set frequencies. The first control signal is generated according to the set frequency and the duration, so that the inverter converts the current provided by the power battery into the alternating current with the set frequency. New frequency components are introduced to evenly distribute originally concentrated radial electromagnetic forces to the entire stator, thereby reducing vibration noises during the heating process of the power battery.

Another embodiment of the present application provides a control method. The control method is applied to the power system shown in FIG. 1. An execution body of the control method is an MCU, and the control method includes the following steps:

S401. The MCU obtains a battery cell temperature of the power battery.

A temperature sensor is deployed inside the power battery to monitor the battery cell temperature of the power battery in real time, and the temperature sensor transmits the detected battery cell temperature to the MCU.

S402. The MCU sends a first control signal to the inverter when determining that the battery cell temperature meets a heating condition of the power battery.

When the battery cell temperature is lower than the lowest operating temperature, the first control signal is sent to the inverter. The first control signal is configured to control the inverter to convert a current provided by the power battery into an alternating current with a randomly changing frequency, and the alternating current with a randomly changing frequency is configured to supply power to the permanent magnet motor.

S403. A second control signal is sent to the inverter when an ambient temperature meets a preset heating condition of the power battery.

When the battery cell temperature is lower than the lowest operating temperature, the second control signal is also sent to the inverter. The second control signal is configured to control the inverter to convert a current provided by the power battery into an alternating current with a periodically changing amplitude, and the alternating current with a periodically changing amplitude is configured to supply power to the permanent magnet motor.

Figure 8:
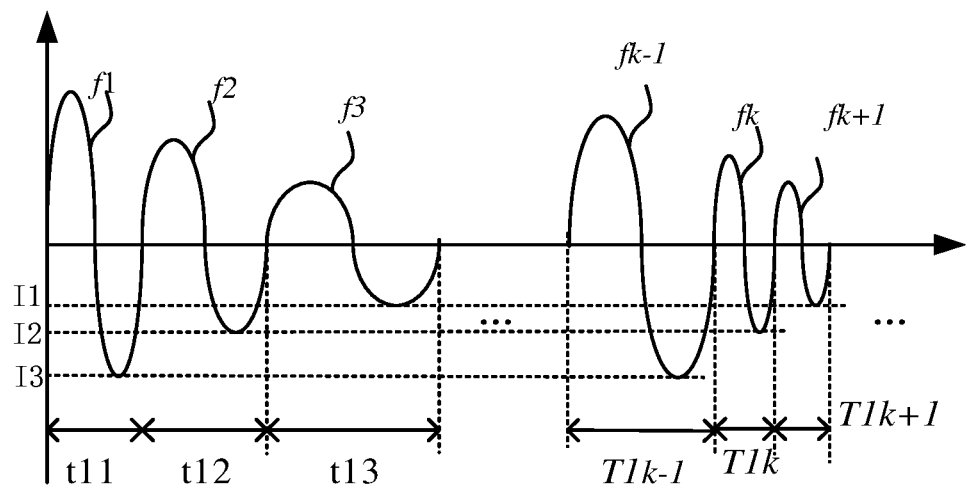
FIG. 8 is a schematic diagram of an alternating current for driving a motor according to an embodiment of the present application.

As shown in FIG. 8, under the control of the first control signal and the second control signal, the inverter converts the current provided by the power battery into an alternating current with a randomly changing frequency and a periodically changing amplitude, so that the power battery uses its own resistance for self-heating.

According to the control method provided in the embodiments of the present application, the first control signal and the second control signal are generated when the battery cell temperature of the power battery meets the self-heating condition of the battery, so that the inverter converts the current provided by the power battery into the alternating current with a randomly changing frequency and a periodically changing amplitude. More frequency components are introduced to evenly distribute originally concentrated radial electromagnetic forces to the entire stator, thereby greatly reducing vibration noises during the heating process of the power battery.

Another embodiment of the present application provides a control method. The control method is applied to the power system shown in FIG. 1. An execution body of the control method is an MCU, and the control method includes the following steps:

S501. The MCU obtains a battery cell temperature of the power battery.

S502. The MCU generates a plurality of set frequencies randomly when determining that the battery cell temperature meets a heating condition of the power battery, and determines duration of each set frequency according to each set frequency.

S503. A reference value sequence of a d-axis component is determined according to the set frequencies and the duration of each set frequency, and a reference signal sequence of a q-axis component is set to a zero sequence.

S504. A first control signal is generated according to the reference value sequence of the d-axis component, the reference value sequence of the q-axis component, and a motor parameter of the permanent magnet motor.

S505. The MCU sends the first control signal to the inverter when determining that the battery cell temperature meets the heating condition of the power battery.

Steps S501 to S505 have been described in detail in the foregoing embodiments, and details are not described herein again.

S506. A plurality of set amplitudes and duration of each set amplitude are determined according to a heating parameter and a maximum noise threshold of the power battery.

The Heating parameter includes a heating rate and a heating duration. The maximum noise threshold refers to a threshold of vibration noise of the motor. The greater the set amplitude, the longer the duration, and the greater the heating rate, the shorter the heating duration.

When determining the set amplitude, a current amplitude Id0 corresponding to a required heating rate under a constant amplitude and a constant frequency may be obtained. Id0 is used as an average value of variable amplitudes to generate a plurality of set amplitudes. The number of the set amplitudes is not limited herein.

S507. A reference value sequence of a d-axis component is determined according to the set amplitudes and the duration of each set amplitude, and a reference value sequence of a q-axis component is set to a zero sequence.

If the set amplitudes are I1, I2, . . . , and In, the duration corresponding to the set frequency I1 is t21, the duration corresponding to the set frequency I2 is t22, . . . , and the duration corresponding to the set frequency In is t2n.

The reference value sequence of the d-axis component includes a plurality of reference values. Each reference value includes an amplitude reference value component, a frequency reference value component, and a duration reference value component. The frequency reference value component may also be any value f1, the amplitude reference value component is the set amplitude, and the duration reference value component is the duration corresponding to the set amplitude. Namely, the reference value sequence of the d-axis component is {(I1, f1, t21), (I2, f1, t22), . . . , (In, f1, t2n), (I1, f1, t21), (I2, f1, t22), . . . , (In, f1, t2n), . . . }.

The reference value sequence of the q-axis component includes a plurality of reference values. Each reference value includes an amplitude reference value component, a frequency reference value component, and a duration reference value component. The amplitude reference value component, the frequency reference value component, and the duration reference value component are all zero. Namely, the reference value sequence of the q-axis component is {(0, 0, 0), (0, 0, 0), . . . , and (0, 0, 0)}.

In some embodiments, the amplitude reference value in the reference value sequence of the d-axis component sequentially increases or decreases, namely, I1≤I2 . . . ≤In, or I1≥I2 . . . ≥In. More frequency components may be introduced by using an alternating current with a periodically increasing amplitude or a periodically decreasing amplitude to power the motor, so that the originally concentrated radial electromagnetic forces is distributed evenly to the entire stator, thereby greatly reducing vibration noises during the heating process of the power battery.

S508. A second control signal is generated according to the reference value sequence of the d-axis component, the reference value sequence of the q-axis component, and a motor parameter of the permanent magnet motor.

The motor parameter of the permanent magnet motor includes a position, a speed, an acceleration, and a stator current of the motor. The method of generating the second control signal is the same as that described in FIG. 4, and details are not described herein again.

S509. The second control signal is sent to the inverter when an ambient temperature meets a preset heating condition of the power battery.

When the battery cell temperature is lower than the lowest operating temperature, the second control signal is also sent to the inverter. The second control signal is configured to control the inverter to convert a current provided by the power battery into an alternating current with a periodically changing amplitude, and the alternating current with a periodically changing amplitude is configured to supply power to the permanent magnet motor.

The period of amplitude change of the alternating current is:

$$T = t_{21} + t_{22} + \ldots t_{2n}$$

According to the control method provided in the embodiments of the present application, the set frequencies are randomly generated when the battery cell temperature of the power battery meets the self-heating condition of the battery, and duration of each set frequency is determined according to the set frequencies, so that the first control signal is generated according to the set frequency and the duration. A plurality of set amplitudes and duration of each set amplitude are determined according to the heating parameter and the maximum noise threshold of the power battery, so that the second control signal is generated according to the set amplitude and the duration. Under common control of the first control signal and the second control signal, the inverter converts the current provided by the power battery into the alternating current with a randomly changing frequency and a periodically changing amplitude. More frequency components are introduced to evenly distribute originally concentrated radial electromagnetic forces to the entire stator, thereby greatly reducing vibration noises during the heating process of the power battery.

Figure 9:
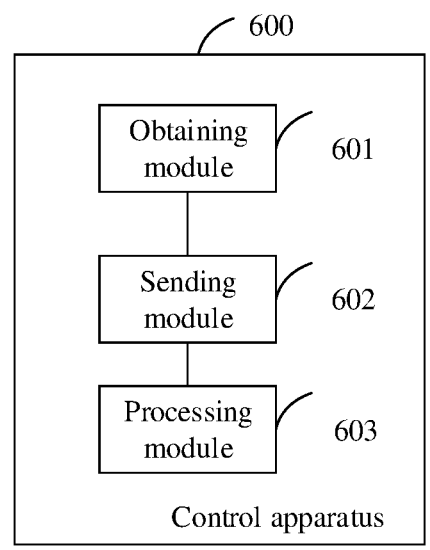
FIG. 9 is a schematic structural diagram of a control apparatus according to an embodiment of the present application.

As shown in FIG. 9, the present application provides a control apparatus 600, and the control apparatus 600 includes:

an obtaining module 601, configured to obtain a battery cell temperature of a power battery; and a sending module 602, configured to send a first control signal to an inverter when the battery cell temperature meets a preset power battery heating condition, where the first control signal is configured to control the inverter to convert a current provided by the power battery into an alternating current with a randomly changing frequency, and the alternating current with a randomly changing frequency is configured to supply power to the permanent magnet motor.

In some embodiments, the apparatus further includes a processing module 603, and the processing module 603 is specifically configured to:

generate a plurality of set frequencies randomly, and determine duration of each set frequency according to each set frequency;

determine a reference value sequence of a d-axis component according to the set frequencies and the duration of each set frequency, and set a reference signal sequence of a q-axis component to a zero sequence; and generate the first control signal according to the reference value sequence of the d-axis component, the reference value sequence of the q-axis component, and a motor parameter of the permanent magnet motor.

In some embodiments, the processing module 603 is specifically configured to:

take an entire period length corresponding to the set frequency as the duration of the set frequency; or take a half period length corresponding to the set frequency as the duration of the set frequency.

In some embodiments, the sending module 602 is further configured to:

send a second control signal to the inverter when the battery cell temperature meets a preset power battery heating condition, where the second control signal is configured to control the inverter to convert a current provided by the power battery into an alternating current with a periodically changing amplitude, and the alternating current with a periodically changing amplitude is configured to supply power to the permanent magnet motor.

In some embodiments, the processing module 603 is further configured to:

determine a plurality of set amplitudes and duration of each set amplitude according to a heating parameter and a maximum noise threshold of the power battery;

determine a reference value sequence of a d-axis component according to the set amplitudes and the duration of each set amplitude, and set a reference value sequence of a q-axis component to a zero sequence; and generate the second control signal according to the reference value sequence of the d-axis component, the reference value sequence of the q-axis component, and a motor parameter of the permanent magnet motor.

In some embodiments, the heating parameter includes a heating rate and a heating duration.

In some embodiments, an amplitude reference value in the reference value sequence of the d-axis component increases or decreases periodically.

In some embodiments, the processing module 603 is specifically configured to:

the battery cell temperature is less than the lowest operating temperature of the power battery.

An embodiment of the present application provides a power system, including: a power battery, an inverter, a permanent magnet motor, and a motor controller unit. The motor controller unit is configured to execute the control method described in the foregoing embodiments. However, change of frequency will induce a large amount of eddy current loss in a stator, a rotor core, and a permanent magnet of the motor, causing a large amount of heat of the motor. A heat dissipation apparatus may be installed in the motor to avoid the motor from burning.

An embodiment of the present application provides an electric vehicle, including a power system, where the power system includes a power battery, an inverter, a permanent magnet motor, and a motor controller unit. The motor controller unit is configured to execute the control method described in the foregoing embodiments.

It should finally be noted that the foregoing embodiments are merely intended for illustrating rather than limiting the technical solutions of the present application. Although the present application is described in detail with reference to the foregoing embodiments, those of ordinary skill in the art should understand that they may still make modifications to the technical solutions described in the foregoing embodiments, or make equivalent substitutions to some or all technical features thereof; but these modifications or substitutions can be made to the respective technical solutions without departing from the technical solutions of the embodiments of the present application.

What is claimed is:

1. A control method, the method being applied to a power system, the power system comprising a power battery, a permanent magnet motor, and an inverter, the method comprising:
   obtaining a battery cell temperature of the power battery; and
   sending a first control signal to the inverter when the battery cell temperature meets a preset power battery heating condition, wherein the first control signal is configured to control the inverter to convert a current provided by the power battery into an alternating current with a randomly changing frequency, and wherein the alternating current with the randomly changing frequency is configured to supply power to the permanent magnet motor,
   wherein before the sending the first control signal to the inverter, the method further comprises:
      generating a plurality of set frequencies randomly, and determining duration of each set frequency according to each set frequency;
      determining a reference value sequence of a d-axis component according to the plurality of set frequencies and the duration of each set frequency, and setting a reference value sequence of a q-axis component to a zero sequence; and
      generating the first control signal according to the reference value sequence of the d-axis component, the reference value sequence of the q-axis component, and a motor parameter of the permanent magnet motor,
   wherein the determining the duration of each set frequency according to each set frequency comprises:
      taking an entire period length corresponding to the set frequency as the duration of the set frequency, or
      taking a half period length corresponding to the set frequency as the duration of the set frequency, and
   wherein the method further comprises sending a second control signal to the inverter when the battery cell temperature meets the preset power battery heating condition.

2. The method according to claim 1, wherein the second control signal is configured to control the inverter to convert a current provided by the power battery into an alternating current with a periodically changing amplitude, and the alternating current with the periodically changing amplitude is configured to supply power to the permanent magnet motor.

3. The method according to claim 2, wherein before the sending the second control signal to the inverter, the method further comprises:
   determining a plurality of set amplitudes and duration of each set amplitude according to a heating parameter and a maximum noise threshold of the power battery;
   determining a reference value sequence of a d-axis component according to the plurality of set amplitudes and the duration of each set amplitude, and setting a reference value sequence of a q-axis component to a zero sequence; and
   generating the second control signal according to the reference value sequence of the d-axis component, the reference value sequence of the q-axis component, and a motor parameter of the permanent magnet motor.

4. The method according to claim 3, wherein the heating parameter comprises a heating rate and a heating duration.

5. The method according to claim 3, wherein an amplitude reference value in the reference value sequence of the d-axis component increases or decreases periodically.

6. The method according to claim 1, wherein the battery cell temperature meets a preset power battery heating condition comprises:
   the battery cell temperature is less than the lowest operating temperature of the power battery.

7. A power system, comprising: a power battery, an inverter, a permanent magnet motor, and a motor controller unit, wherein the motor controller unit is configured to execute the control method according to claim 1.

8. An electric vehicle, comprising a power system, wherein the power system comprises a power battery, an inverter, a permanent magnet motor, and a motor controller unit, and the motor controller unit is configured to execute the control method according to claim 1.

9. A control apparatus, comprising:
   an obtaining module, configured to obtain a battery cell temperature of a power battery;
   a sending module, configured to send a first control signal to an inverter when the battery cell temperature meets a preset power battery heating condition, wherein the first control signal is configured to control the inverter to convert a current provided by the power battery into an alternating current with a randomly changing frequency, and wherein the alternating current with the randomly changing frequency is configured to supply power to a permanent magnet motor; and
   a processing module, configured to:
      generate a plurality of set frequencies randomly, and determine duration of each set frequency according to each set frequency;
      determine a reference value sequence of a d-axis component according to the plurality of set frequencies and the duration of each set frequency, and set a reference value sequence of a q-axis component to a zero sequence; and
      generate the first control signal according to the reference value sequence of the d-axis component, the reference value sequence of the q-axis component, and a motor parameter of the permanent magnet motor,
   wherein the processing module is further configured to:
      take an entire period length corresponding to the set frequency as the duration of the set frequency, or
      take a half period length corresponding to the set frequency as the duration of the set frequency, and wherein the sending module is further configured to send a second control signal to the inverter when the battery cell temperature meets the preset power battery heating condition.

10. The apparatus according to claim 9,
wherein the second control signal is configured to control the inverter to convert a current provided by the power battery into an alternating current with a periodically changing amplitude, and the alternating current with the periodically changing amplitude is configured to supply power to the permanent magnet motor.

11. The apparatus according to claim 10, wherein the processing module is further configured to:
determine a plurality of set amplitudes and duration of each set amplitude according to a heating parameter and a maximum noise threshold of the power battery;
determine a reference value sequence of a d-axis component according to the plurality of set amplitudes and the duration of each set amplitude, and set a reference value sequence of a q-axis component to a zero sequence; and
generate the second control signal according to the reference value sequence of the d-axis component, the reference value sequence of the q-axis component, and a motor parameter of the permanent magnet motor.

12. The apparatus according to claim 11, wherein the heating parameter comprises a heating rate and a heating duration.

13. The apparatus according to claim 11, wherein an amplitude reference value in the reference value sequence of the d-axis component increases or decreases periodically.

14. The apparatus according to claim 9, wherein the battery cell temperature meets a preset power battery heating condition comprises:
the battery cell temperature is less than the lowest operating temperature of the power battery.

* * * * *